United States Patent
Pink et al.

(10) Patent No.: US 10,481,603 B2
(45) Date of Patent: Nov. 19, 2019

(54) DEVICE AND METHOD FOR OPERATING A VEHICLE

(71) Applicant: Robert Bosch GmbH, Stuttgart (DE)

(72) Inventors: Oliver Pink, Ditzingen (DE); Karsten Muehlmann, Stuttgart (DE); Armin Ruehle, Weinstadt (DE); Michael Helmle, Esslingen (DE); Christoph Schroeder, Pleidelsheim (DE); Rainer Baumgaertner, Pfaffenhofen (DE); Jeannine Schwarzkopf, Ludwigsburg (DE); Florian Hauler, Linkenheim (DE)

(73) Assignee: Robert Bosch GmbH, Stuttgart (DE)

( * ) Notice: Subject to any disclaimer, the term of this patent is extended or adjusted under 35 U.S.C. 154(b) by 342 days.

(21) Appl. No.: 15/319,063

(22) PCT Filed: May 8, 2015

(86) PCT No.: PCT/EP2015/060194
§ 371 (c)(1),
(2) Date: Dec. 15, 2016

(87) PCT Pub. No.: WO2015/197251
PCT Pub. Date: Dec. 30, 2015

(65) Prior Publication Data
US 2017/0115661 A1    Apr. 27, 2017

(30) Foreign Application Priority Data
Jun. 27, 2014   (DE) .................. 10 2014 212 384

(51) Int. Cl.
*G05D 1/00* (2006.01)
*B60W 50/023* (2012.01)
(Continued)

(52) U.S. Cl.
CPC .......... *G05D 1/0061* (2013.01); *B60W 30/06* (2013.01); *B60W 50/023* (2013.01);
(Continued)

(58) Field of Classification Search
None
See application file for complete search history.

(56) References Cited

U.S. PATENT DOCUMENTS 4,654,846 A * 3/1987 Goodwin ............. G05D 1/0077
                                                    700/82
9,195,232 B1 * 11/2015 Egnor ................. G05D 1/0077
(Continued)

FOREIGN PATENT DOCUMENTS

DE   102012211901 A1   1/2014
DE   102013020177 A1 * 6/2014 .......... B60W 50/023
(Continued)

OTHER PUBLICATIONS

International Search Report dated Jul. 29, 2015, of the corresponding International Application PCT/EP2015/060194 filed May 8, 2015.

*Primary Examiner* — David P. Merlino
(74) *Attorney, Agent, or Firm* — Norton Rose Fulbright US LLP; Gerard Messina

(57) ABSTRACT

An apparatus for operating a vehicle, including a control device that is configured to guide the vehicle automatically; and a monitoring device that is configured to monitor the control device for a fault during automatic guidance of the vehicle by the control device, and upon recognition of a fault to take over automated guidance of the vehicle from the control device. A corresponding method and a computer program are also described.

11 Claims, 1 Drawing Sheet

(51) Int. Cl.
*B60W 30/06* (2006.01)
*B60W 50/029* (2012.01)
*B60W 50/00* (2006.01)

(52) U.S. Cl.
CPC ... *B60W 50/029* (2013.01); *B60W 2050/0006* (2013.01); *G05D 2201/0213* (2013.01)

(56) References Cited

U.S. PATENT DOCUMENTS

| | | | | |
|---|---|---|---|---|
| 9,523,984 | B1* | 12/2016 | Herbach | G05D 1/0088 |
| 9,573,682 | B2* | 2/2017 | Heusinger | G05D 1/0077 |
| 2013/0268798 | A1* | 10/2013 | Schade | G06F 11/1487 |
| | | | | 714/3 |
| 2014/0277608 | A1* | 9/2014 | Debouk | G05B 9/03 |
| | | | | 700/79 |
| 2015/0134178 | A1* | 5/2015 | Minoiu-Enache | |
| | | | | B60W 50/035 |
| | | | | 701/23 |
| 2015/0142244 | A1* | 5/2015 | You | G05D 1/0061 |
| | | | | 701/23 |

FOREIGN PATENT DOCUMENTS

| | | | |
|---|---|---|---|
| EP | 2314490 A1 | 4/2011 | |
| EP | 2390862 A2 | 11/2011 | |
| JP | H07108853 A | 4/1995 | |
| JP | H1153207 A | 2/1999 | |
| JP | 2011070311 | 4/2011 | |
| WO | 2013150244 A1 | 10/2013 | |
| WO | 2014044480 A2 | 3/2014 | |
| WO | WO-2014148976 A1 * | 9/2014 | ........... G05D 1/0088 |

* cited by examiner

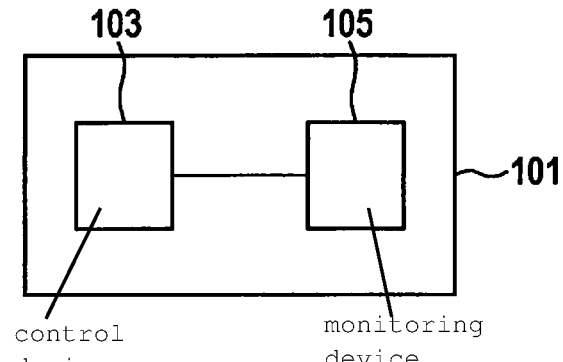
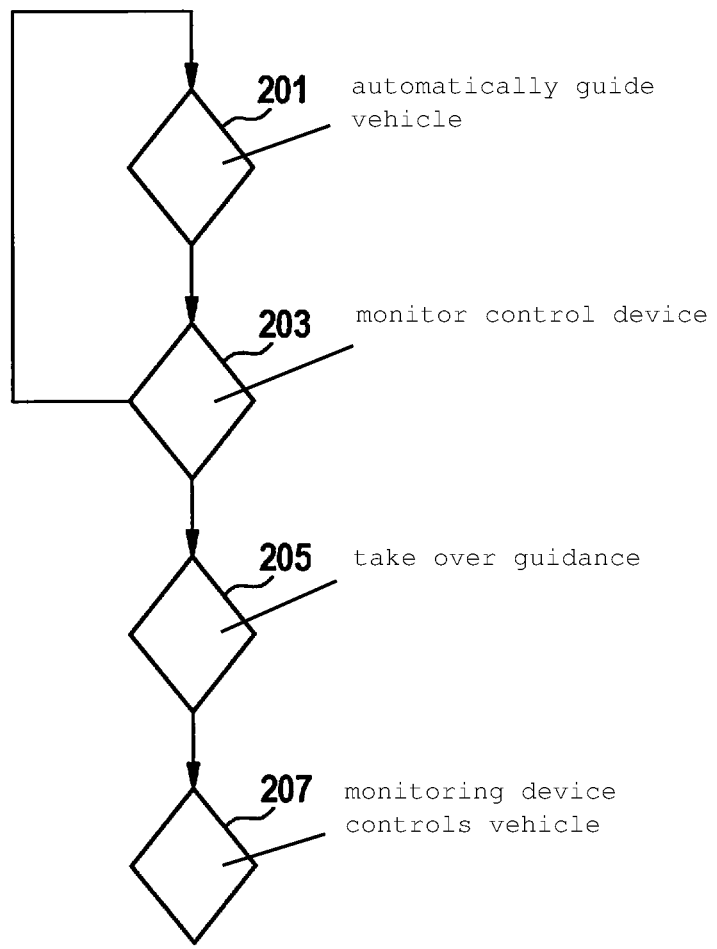

DEVICE AND METHOD FOR OPERATING A VEHICLE

FIELD

The present invention relates to an apparatus and a method for operating a vehicle. The present invention further relates to a computer program.

BACKGROUND INFORMATION

Driver assistance systems for highly automated driving are at present in the formative phase. Precautions with regard to functional safety concepts are often present in only very rudimentary fashion, and for the most part are still backed up by human intervention. Market introduction requires functional safety concepts that are entirely or partly fail-operational (critical faults are recognized; the minimum necessary functionality continues to be implemented safely even in the event of a fault). Present-day systems in the automotive environment are implemented predominantly in fail-safe fashion (critical faults are recognized; functionality is transferred into a safe state).

Systems for highly automated driving are technically complex. They require high computational performance and a large memory. Complete implementation of such large systems as fail-operational is possible today only with great difficulty.

SUMMARY

An object of the present invention is to provide an improved apparatus for operating a vehicle, which apparatus can continue to perform an automated driving function even in a fault situation, i.e., is at least partly fail-operational.

An object of the present invention is also to provide a corresponding method for operating a vehicle.

An object of the present invention is also to provide a corresponding computer program.

Advantageous embodiments of the present invention are described herein.

According to one aspect, an apparatus for operating a vehicle is furnished, including:
  a control device that is configured to guide the vehicle automatically; and
  a monitoring device that is configured to monitor the control device for a fault during automatic guidance of the vehicle by the control device, and upon recognition of a fault to take over automated guidance of the vehicle from the control device.

According to another aspect, a method for operating a vehicle is furnished, encompassing the following steps:
  automated guidance of the vehicle by a control device;
  monitoring of the control device for a fault by way of a monitoring device while the control device is automatically guiding the vehicle;
  takeover of automated guidance from the control device by the monitoring device if the monitoring device recognizes a fault.

According to yet another aspect, a computer program is furnished which encompasses program code for carrying out the method for operating a vehicle when the computer program is executed on a computer.

According to one aspect, a vehicle encompassing the apparatus is furnished.

The present invention includes providing a monitoring device that monitors the control device while the control device is automatically guiding the vehicle. In the event of a fault in the control device, the monitoring device takes over guidance of the vehicle from the control device. The monitoring device then controls the vehicle itself. The result thereof is in particular to bring about the technical advantage that the vehicle can continue to be guided automatically even in a fault situation. Immediate intervention by a driver of the vehicle is thus no longer absolutely necessary. This can advantageously decrease an accident risk, in that the driver is now given more time to adjust and react to the fault situation. The monitoring device thus advantageously creates a backup that can compensate for faulty operation of the control device. Overall vehicle safety is thereby advantageously enhanced.

Embodiments in terms of the method result analogously from embodiments in terms of the apparatus, and vice versa. Embodiments, advantages, and technical effects with regard to the apparatus result analogously from embodiments in terms of the method, and vice versa.

For purposes of the present invention, "automated guidance" refers in particular to a guidance process in which a driver of the vehicle does not make any intervention. In other words, during automated guidance the vehicle is autonomously and independently guided by the control device or by the monitoring device.

According to an embodiment provision is made that the control device and the monitoring device have an identical function inventory encompassing several functions, the monitoring device being configured, in order to monitor the control device, to monitor all functions of the control device for a fault.

According to an embodiment, provision is made that the control device and the monitoring device have an identical function inventory encompassing several functions, the monitoring device, in order to monitor the control device, monitoring all functions of the control devices for a fault and, in particular, being capable of taking over its function or functions. Examples of such functions are: sensor preprocessing, environment modeling, collision recognition, localization, planning, actuator control.

Full redundancy is thereby advantageously brought about. The monitoring device has the same function inventory as the control device. The result thereof is in particular to bring about the technical advantage that the monitoring device can accurately monitor, in all circumstances, whether the control device is still correctly calculating, i.e., is correctly guiding the vehicle. The monitoring device takes over completely in the event of a fault and can furnish the entire function inventory of the control device. Any loss of convenience is thereby advantageously avoided, since all driving functions that the control device can furnish can also be furnished by the monitoring device. In order to ensure or effect this, assurance is provided in particular that the monitoring device and the control device (principal function) are sufficiently common cause-free regarding the critical fault patterns.

Be it noted at this juncture that convenience is one thing. More important than any loss of convenience is safety. In the context of automated driving, the driver can require some time before he or she can take over. Until that point in time at which he or she takes over, the monitoring device must take over. In other words, during an automated journey the monitoring device guides the vehicle until the driver takes over. And if the driver is entirely unable to take over, the vehicle must then be brought into a safe state. This is carried out preferably by way of the monitoring device.

According to another embodiment provision is made that the monitoring device has as a function inventory a subset of a function inventory encompassing several functions of the control device, the monitoring device being configured, in order to monitor the control device, to monitor for a fault exclusively those functions of the function inventory of the control device which correspond to the subset.

According to another embodiment provision is made that the monitoring device has as a function inventory a subset of a function inventory encompassing several functions of the control device, the monitoring device, in order to monitor the control device, monitoring for a fault exclusively those functions of the function inventory of the control device which correspond to the subset.

The result thereof is in particular to bring about the technical effect that the monitoring device requires less computational performance and less memory than the control device. This is because the monitoring device is limited, in terms of monitoring, to a subset of the function inventory of the control device. In particular, it is limited to a safe subset of the function inventory of the control device which meets necessary safety requirements by covering installed system components (for example, sensors, actuators, or control devices). The control device cannot meet all convenience requirements in the event of a fault, but advantageously, safety requirements are met. Functions that create convenience but cannot be furnished by the monitoring device in accordance with this embodiment are, for example: transition to an inconvenient driving style, defensive driving style with increased spacings from other traffic participants, decrease in maximum speed, suppression of passing maneuvers, transition to following mode behind preceding traffic. In order to provide true monitoring and to ensure a safe takeover, according to an embodiment provision is made in particular that there is assurance that the monitoring device and the control device (principal function) are sufficiently common cause-free in terms of the critical fault patterns. That also includes, in particular, the sensors and actuators.

In another embodiment provision is made that the monitoring device is configured to park the vehicle safely upon recognition of a fault.

In another embodiment provision is made that the monitoring device parks the vehicle safely upon recognition of a fault.

The result thereof is in particular to bring about the technical advantage that the vehicle can be quickly brought into a safe state. Provision is made, for example, that a parking space is arrived at and the vehicle is parked there. This can advantageously enhance safety in that after being parked, the vehicle is at a distance from the flow of traffic.

According to another embodiment provision is made that the monitoring device is configured to recognize, based on an instantaneous reference trajectory and a future reference trajectory that have both been ascertained by way of the control device, an instantaneous and a future guidance intention of the control device and to decide, based on the recognized guidance intentions, whether or not a fault exists.

In another embodiment provision is made that the monitoring device recognizes, based on an instantaneous reference trajectory and a future trajectory that have both been ascertained by way of the control device, an instantaneous and a future guidance intention of the control device, and decides based on the recognized guidance intentions whether or not a fault exists. The instantaneous reference trajectory and the future reference trajectory are defined, for example, as follows: the instantaneous reference trajectory is understood as the instantaneous intention (for example, the direct control intention) and the future reference trajectory is understood as the true reference trajectory that looks forward, for example, over a predetermined time span, for example y=10 seconds. (In this, the future control intention is typically stored with a time resolution of, for example, x milliseconds (e.g. x=10).) More precisely this means that without the future reference trajectory, the fault becomes apparent very much later. With the future reference trajectory it is possible to react up to y seconds in advance.

According to another embodiment provision is made that the monitoring device is configured to ascertain a safety reference trajectory and, in a fault situation, to guide the vehicle based on the safety reference trajectory.

According to another embodiment provision is made that the monitoring device ascertains a safety reference trajectory and, in a fault situation, guides the vehicle based on the safety reference trajectory.

The safety reference trajectory is ascertained in particular during automated guidance of the vehicle by the control device. In particular, the safety reference trajectory is ascertained in the fault situation. The safety reference trajectory is used in particular in order to achieve a safe state. In particular, the vehicle is parked safely based on the safety reference trajectory. The result of providing a safety reference trajectory is in particular to bring about the technical advantage that the vehicle can be brought quickly and safely into a safe state. The two trajectories (i.e. the safety trajectory that has been ascertained by way of the control device, and the safety trajectory that has been ascertained by way of the monitoring device) can be, for example, plausibilized against one another, for example by checking for collision (i.e. one or both trajectories are checked, for example, for collision). Because the trajectories must be correct at every point in time (they are calculated every x ms, for example every 10 ms), the possibility exists of falling back, in the fault situation, on the safety trajectory from the previous x ms cycle. Provision is thus also made in particular that the principal function (the control device) calculates both the reference trajectory and the safety reference trajectory, and the monitoring device monitors both.

According to a further embodiment provision is made that the monitoring device is configured to ascertain the safety reference trajectory based on the last reference trajectory recognized as valid that has been ascertained by the control device.

In another embodiment provision is made that the monitoring device ascertains the safety reference trajectory based on the last reference trajectory recognized as valid that has been ascertained by way of the control device. The safety trajectory does not obligatorily need to be calculated based on the reference trajectory. The safety trajectory can be simply calculated, for example, as obstacle-free to a standstill. If the last reference trajectory is taken as a basis, better performance with regard to the planned route can then thereby be achieved.

The complexity is decreased, because otherwise the entire process of reference trajectory creation has to be executed once again. It can be useful, however, and provision can for example be made, to deliberately accept the increased outlay in order to calculate the best safety trajectory in a context of intensified requirements; for example, the safety trajectory is selected so that the hazard potential is minimized, or selected so that the obstacle-free state is achieved and maintained, or selected so that in a context of failure, for example with reduced fallback functionality, it is still possible to drive safely to a standstill.

A calculation outlay for ascertaining the safety reference trajectory is thereby advantageously reduced, since advantageously, the last reference trajectory of the control device which is recognized as valid is what is used as a safety reference trajectory.

According to another embodiment provision is made that the last reference trajectory recognized as valid encompasses a lateral and a longitudinal trajectory, the monitoring device being configured, in order to ascertain the safety reference trajectory, to retain the lateral trajectory and to overwrite the longitudinal trajectory with a newly ascertained longitudinal trajectory or, in order to ascertain the safety reference trajectory, to retain the longitudinal trajectory and to overwrite the lateral trajectory with a newly ascertained lateral trajectory.

In a further embodiment provision is made that the last reference trajectory recognized as valid encompasses a lateral and a longitudinal trajectory, the monitoring device, in order to ascertain the safety reference trajectory, retaining the lateral trajectory and overwriting the longitudinal trajectory with a newly ascertained longitudinal trajectory or, in order to ascertain the safety reference trajectory, retaining the longitudinal trajectory and overwriting the lateral trajectory with a newly ascertained lateral trajectory.

In other words, the safety reference trajectory either encompasses the lateral trajectory and the newly ascertained longitudinal trajectory, or encompasses the longitudinal trajectory and the newly ascertained lateral trajectory. Advantageously, a calculation outlay in the context of ascertaining the safety reference trajectory is reduced by the fact that either the lateral or the longitudinal trajectory is retained, since in order to ascertain the safety reference trajectory it is sufficient for only one of the two trajectories to be newly ascertained.

According to another embodiment, provision is made that the monitoring device is configured to ascertain, for collision detection and/or hazard detection, an open space in the environment of the vehicle.

In another embodiment, provision is made that the monitoring device ascertains, for collision detection and/or hazard detection, an open space in the environment of the vehicle.

The result thereof is, for example, to bring about the technical advantage that knowledge exists as to which areas in the environment of the vehicle can be traveled on and which not. An imminent collision can thereby advantageously be recognized. Corresponding countermeasures can then advantageously be taken.

The present invention is explained in further detail below on the basis of preferred exemplifying embodiments.

BRIEF DESCRIPTION OF EXAMPLE EMBODIMENTS

FIG. 1 shows an apparatus for operating a vehicle.
FIG. 2 is a flow chart of a method for operating a vehicle.

DETAILED DESCRIPTION OF EXAMPLE EMBODIMENTS

Apparatus 101 encompasses a control device 103 that is configured to guide the vehicle automatically. Apparatus 101 furthermore encompasses a monitoring device 105 that is configured to monitor control device 103 for a fault during automated guidance of the vehicle by control device 103, and upon recognition of a fault to take over automated guidance of the vehicle from control device 103.

In order to guide the vehicle, the two devices 103 and 105 are preferably each operatively connected to actuators and/or control devices of such actuators in order to control them, for example actuators of a braking system, actuators of a steering system, and/or actuators of a drive system of the vehicle.

A plurality of data are used, in particular, in order to guide the vehicle. Such data can be, for example, sensor data of environment sensors. Such data can be, in particular, vehicle data of further vehicles. This means, for example, that an environment of the vehicle is detected, for example in sensor-based fashion, automated guidance of the vehicle being carried out based on the environment detected in sensor-based fashion. This means, for example, that vehicle data of further vehicles can be received, automated guidance of the vehicle being carried out based on the vehicle data. The apparatus encompasses for this purpose, for example, a communication interface for receiving vehicle data of further vehicles. The two devices 103, 105 are configured in particular to automatically guide or control the vehicle based on the sensor data and/or vehicle data.

FIG. 2 is a flow chart of a method for operating a vehicle.

In a step 201 the vehicle is automatically guided by a control device. In a step 203 a monitoring device monitors the control device for a fault while the control device is automatically guiding the vehicle in accordance with step 201. If the monitoring device does not recognize a fault, it does not take over guidance of the vehicle from the control device. Instead, the control device continues to control the car automatically.

The method starts again at step 201. If the monitoring device recognizes a fault in the control device, however, then in a step 205 the monitoring device takes over guidance of the vehicle from the control device. In a step 207 the monitoring device then controls the vehicle.

Guiding or controlling the vehicle by way of the monitoring device can encompass, for example, the step that the monitoring device parks the vehicle safely. In particular, the monitoring device can return guidance of the vehicle back to the control device when the control device is again functioning correctly. This can recognize the monitoring device. In the simplest case the monitoring device continues to monitor the trajectories of the control device even after taking over, and could then give back control to the control device if correct values arrive again for a minimum time period. This is advantageous, for example, if the safe state is not a standstill but instead, for example, a following mode behind preceding traffic. Additionally or alternatively, provision is made according to an embodiment that the monitoring device reports back to the control device that it has recognized a fault. After elimination of the fault, transfer back to the control device can then once again preferably occur.

In particular, the monitoring device controls the vehicle until a driver of the vehicle takes over control again. For example, a takeover desire of the driver can be detected for this purpose, so that control can then be correspondingly transferred from the monitoring device to the driver.

The present invention thus encompasses in particular the provision of two instances (here the two devices):
1. The actual function of highly automated driving with reduced requirements regarding functional safety: realized here by the control device.
2. The monitoring device (which can also be referred to as a "monitor"), which as a rule encompasses only a reduced functionality with regard to highly automated driving, but with necessary functional safety.

In order to reduce the requirements regarding functional safety, according to an embodiment provision is made that a decision instance (decider) is provided which decides with the combined safety which of the two parts (control device and monitor) is correct. The decider itself is as a rule simple, and can be implemented, for example, as a separate part in the control device (main function).

1. It can also be implemented as a separate part in the monitor.
2. Implemented independently.
3. Implemented as part of the actuator suite.

Fundamentally, the following three strategies regarding a reaction to the monitoring device can be provided in further embodiments:

1. The monitoring device briefly overrides the system (vehicle) in a context of small deviations.
2. The monitoring system overrides the system on a long-term basis in a context of larger and hazardous deviations (for example, brings the system (vehicle) into a safe state, or takes over until the driver takes over, or takes over until the control device is again demonstrably working correctly).
3. The monitoring device overrides the system on a long-term basis in a context of small and larger and hazardous deviations (for example, brings the system (vehicle) into a safe state, or takes over until the driver takes over, or takes over until the control device is again demonstrably working correctly).

The monitoring device must monitor at least some of the functionality of the control device. For that purpose it must also contain some of the functionality.

The following embodiments are provided:

In an embodiment, the monitoring device has the same function inventory as the control device. The result is that it can accurately monitor, in all circumstances, whether the control device is still correctly calculating. The monitoring device can in fact completely take over in a fault situation. This embodiment has the technical advantage of full redundancy.

In an embodiment, the monitoring device is limited to a safe subset of the function inventory of the control device which meets the necessary safety requirements by covering the installed system components (sensors, actuators, control devices). The monitoring device cannot meet all convenience requirements in a fault situation, but the safety requirements are met.

In another embodiment the monitoring device is limited to a function inventory of an automatic emergency braking system.

According to another embodiment the monitoring device is limited to a function inventory of an expanded emergency braking system that is expanded as follows as compared with the emergency braking system recited above. The monitoring device additionally utilizes the reference trajectories supplied by the control device. The monitoring device thus knows the current and short-term future intention of the control device and can correspondingly react more precisely. An indirect collision check, for example, would thus be possible.

According to a further embodiment the monitoring device itself additionally calculates or ascertains a safety reference trajectory or a safety reference path. The safety reference trajectory or the safety reference path is used to achieve the safe state when a fault situation is recognized.

According to another embodiment the monitoring device is limited to a minimum inventory that is necessary for collision recognition and/or hazard recognition. A reduction in the implementation outlay as compared with the control device is thereby brought about (less memory and less computation performance). Functions that are encompassed by the minimum function inventory are, for example, trajectory-based collision identification, recognizing the traffic flow and the associated intention (oncoming traffic, own lane, adjacent lane, cross traffic, . . . ).

According to a further embodiment the monitoring device is limited to ascertaining open space. Ascertaining open space represents a simpler method than "complete" environment modeling. This can suffice for monitoring, however, although preferably a recognition of the traffic flow and the associated intention is generally added. Altogether, however, this still involves less outlay than the principal function.

In another embodiment the monitoring device is limited to ascertaining open space, the monitoring device additionally using the reference trajectory or reference path, supplied by the control device, in order to recognize a current and short-term future intention of the control device. The control device can thereby react correspondingly more precisely. For example, an indirect collision check on the data basis of an emergency braking system is thereby enabled. Without this, monitoring would occur exclusively on a vehicle-model basis, i.e. the current location is predicted into the future and a check is made as to whether a collision will occur. The trajectories expand this to include a prediction of future control events. The expression "more precise" means in particular that, for example, scenarios that previously led to an incorrect takeover due to the absence of that information are categorized as non-critical, but it also means, in particular, the opposite: previously innocuous scenarios become critical scenarios if, for example, the trajectory acts in a manner different from what can be predicted by the model. In other words, "precise" means here an increase in availability and an increase in reliability.

According to a further embodiment the monitoring device is limited to ascertaining open space, the monitoring device itself additionally calculating or ascertaining a safety reference trajectory or a safety path. In addition, according to a further embodiment a check is made for collision and/or hazard recognition with the open spaces. In the event a fault situation is recognized, the safety reference trajectory or the safety path is used in order to achieve the safe state, i.e., the vehicle is therefore guided or controlled on the basis thereof by the monitoring device.

According to another embodiment the monitoring device itself additionally ascertains or calculates a safety reference trajectory or a safety path. In the event a fault situation is recognized, the safety reference trajectory or the safety path is used to achieve the safe state.

In an embodiment, a warning is provided to the driver, i.e. the driver is warned. The latter can, if applicable, him- or herself take over guidance or a driving function. In the context of (highly) automated driving it can happen that the driver needs time in order to take over. Strategies for continued safe driving, for example until the driver can take over, are therefore provided according to further embodiments.

If the monitoring device has recognized a fault in the control device, the following functions are then provided in that context, in combination or individually, in corresponding embodiments:

According to an embodiment, a completely defined (i.e. predefined) deceleration to a standstill, or a defined (i.e. predefined) deceleration to a specific reduced speed, i.e. in particular to an acceptable speed and/or a situation-adapted reduced speed, is carried out by way of the monitoring device.

According to an embodiment the monitoring device completely takes over the functionality of the control device in a fault situation, and preferably a defined deceleration of the vehicle to a standstill, or an automatic approach to a parking opportunity, or a defined deceleration to an acceptable speed and/or a situation-adapted reduced speed (see preceding embodiment), is carried out by the monitoring device.

In accordance with a further embodiment the monitoring device calculates or ascertains a safety reference trajectory or a safety path (or several safety reference trajectories or several safety paths) and in a fault situation travels on them with a defined deceleration to a standstill, i.e., controls or guides the vehicle in accordance with the safety reference trajectory or the safety path.

According to another embodiment, in a fault situation the monitoring device decelerates the vehicle with a defined deceleration to a standstill.

In accordance with another embodiment the monitoring device uses the reference trajectory (always also to be understood in the plural) or reference path (always also to be understood in the plural) last recognized as valid, which the control device has supplied in the recent past, in order to drive or control the vehicle on the basis thereof.

Be it noted at this juncture that in light of the entire description (in particular the general section and in particular the description of the Figures), the plural is always also to be understood for the reference trajectory. In other words, the expression "reference trajectory" in particular denotes the expression "one or more reference trajectories."

In accordance with a further embodiment the monitoring device retains the lateral reference trajectory or the lateral reference path and overwrites the longitudinal reference trajectory of the longitudinal reference path. The result is that, for example, a laterally guided deceleration is carried out with defined deceleration to a defined stopping point (for example prior to a collision).

In another embodiment the monitoring device retains the longitudinal reference trajectory or the longitudinal reference path and overwrites the lateral reference trajectory or the lateral reference path. The result is that, for example, a defined and laterally guided deceleration or acceleration is carried out, for example in order to avoid a collision.

The term "defined deceleration" or "deceleration/acceleration" can be alternatively or additionally defined in accordance with the following list:
1. Deceleration adapted to an environmental condition such as moisture, snow, ice, off road/on road, roadway/pavement covering, coefficient of friction.
2. Deceleration/acceleration adapted to vehicles in the environment (collision with preceding vehicle, rear-end collision of following vehicle).
3. Maximum deceleration.
4. Deceleration by x km with defined deceleration (x being a real number greater than zero).
5. Any deceleration profile over time, for example two seconds with little deceleration, then full deceleration to a standstill.

What is claimed is:

1. An apparatus for operating a vehicle, comprising:
a control device that is configured to guide the vehicle automatically; and
a monitoring device that is configured to monitor an operation of the control device for a fault during automatic guidance of the vehicle by the control device, and upon recognition of the fault, to take over automated guidance of the vehicle from the control device, wherein the monitoring device continues monitoring the control device after taking over the automated guidance of the vehicle from the control device, and wherein when the monitoring device determines that the control device has resumed operating without exhibiting the fault after the monitoring device took over the automated guidance of the vehicle, the monitoring device permits the control device to resume control over the automated guidance of the vehicle.

2. The apparatus as recited in claim 1, wherein the control device and the monitoring device having an identical function inventory encompassing several functions, the monitoring device being configured, in order to monitor the control device, to monitor all functions of the control device for the fault.

3. The apparatus as recited in claim 1, wherein the monitoring device has a first function inventory that is a subset of a second function inventory encompassing several functions of the control device, the monitoring device being configured, in order to monitor the control device, to monitor for the fault exclusively those functions of the second function inventory of the control device which correspond to the subset of the first function inventory.

4. The apparatus as recited in claim 1, wherein the monitoring device is configured to park the vehicle safely upon recognition of the fault.

5. The apparatus as recited in claim 1, wherein the monitoring device is configured to recognize, based on an instantaneous reference trajectory and a future reference trajectory that have both been ascertained by way of the control device, an instantaneous and a future guidance intention of the control device and to decide, based on the recognized guidance intentions, whether or not the fault exists.

6. The apparatus as recited in claim 1, wherein the monitoring device is configured to ascertain a safety reference trajectory and, in a fault situation, to guide the vehicle based on the safety reference trajectory.

7. The apparatus as recited in claim 6, wherein the monitoring device is configured to ascertain the safety reference trajectory based on a last reference trajectory recognized as valid that has been ascertained by the control device.

8. The apparatus as recited in claim 7, wherein the last reference trajectory recognized as valid includes a lateral and a longitudinal trajectory, the monitoring device being configured, in order to ascertain the safety reference trajectory, to retain the lateral trajectory and to overwrite the longitudinal trajectory with a newly ascertained longitudinal trajectory or, in order to ascertain the safety reference trajectory, to retain the longitudinal trajectory and to overwrite the lateral trajectory with a newly ascertained lateral trajectory.

9. The apparatus as recited in claim 1, the monitoring device being configured to ascertain, for at least one of collision detection and hazard detection, an open space in the environment of the vehicle.

10. A method for operating a vehicle, comprising:
automatically guiding of the vehicle by a control device;
monitoring an operation of the control device for a fault by way of a monitoring device while the control device is automatically guiding the vehicle; and
taking over of automated guidance from the control device by the monitoring device if the monitoring device recognizes the fault, wherein the monitoring device continues monitoring the control device after taking over the automated guidance of the vehicle from the control device, and wherein when the monitoring device determines that the control device has resumed operating without exhibiting the fault after the monitoring device took over the automated guidance of the vehicle, the monitoring device permits the control device to resume control over the automated guidance of the vehicle.

11. A non-transitory computer-readable storage medium on which is stored a computer program for operating a vehicle, the computer program containing instructions for executing a method for operating a vehicle, the method comprising:

automatically guiding of the vehicle by a control device;

monitoring an operation of the control device for a fault by way of a monitoring device while the control device is automatically guiding the vehicle; and taking over of automated guidance from the control device by the monitoring device if the monitoring device recognizes the fault, wherein the monitoring device continues monitoring the control device after taking over the automated guidance of the vehicle from the control device, and wherein when the monitoring device determines that the control device has resumed operating without exhibiting the fault after the monitoring device took over the automated guidance of the vehicle, the monitoring device permits the control device to resume control over the automated guidance of the vehicle.

* * * * *